United States Patent

[11] 3,574,877

| [72] | Inventor | John W. Stetz<br>Waterloo, N.Y. |
| [21] | Appl. No. | 3,973 |
| [22] | Filed | Jan. 19, 1970<br>Division of Ser. No. 762,028, Sept. 24, 1968.<br>Abandoned |
| [45] | Patented | Apr. 13, 1971 |
| [73] | Assignee | Sylvania Electric Products, Inc. |

[54] APPARATUS FOR CLEANING THE FRIT SEAL EDGE OF CATHODE RAY TUBE FACE PANELS
3 Claims, 2 Drawing Figs.

[52] U.S. Cl. ................................................. 15/97,
118/112
[51] Int. Cl. ..................................................... H01j 9/38
[50] Field of Search .......................................... 15/97, 102,
4; 118/72, 1, 3, 109, 110, 112, 203, 257, 258, 262

[56] References Cited
UNITED STATES PATENTS
3,392,230 7/1968 Willem ........................ 118/1

FOREIGN PATENTS
513,873 10/1969 Great Britain ................ 15/97
631,667 6/1936 Germany ..................... 118/257

*Primary Examiner*—Walter A. Scheel
*Assistant Examiner*—Leon G. Machlin
*Attorneys*—Norman J. O'Malley, Donald R. Castle and William H. Mc Neill

ABSTRACT: A continuous, self-cleaning belt of spongy material is employed to clean the panel edges of surplus screening materials. The method comprises passing the spongy surface through a solvent for the surplus screening materials and causing contact to occur between the surface and the frit seal edge. Two types of apparatus for accomplishing the method are presented, namely: one in which an endless belt is utilized; and a second which employs a sponge-covered roller.

Patented April 13, 1971

3,574,877

INVENTOR.
JOHN W. STETZ
BY
Donald R. Castle
ATTORNEY

APPARATUS FOR CLEANING THE FRIT SEAL EDGE OF CATHODE RAY TUBE FACE PANELS

CROSS-REFERENCE TO RELATED APPLICATION

This application is a division of Ser. No. 762,028 filed Sept. 24, 1968 and assigned to the assignee of the present invention and now abandoned.

BACKGROUND OF THE INVENTION

This invention relates to cathode ray tubes and more particularly to methods and apparatus useful in the manufacture thereof. Still more particularly, the invention is concerned with cleaning the frit seal edge of face panels to be used in color cathode ray tubes of surplus screening materials.

Color cathode ray tubes employ a patterned screen of a multiplicity of phosphors (generally three) each of which, when excited by a cathode ray, emits a different color light. The different phosphors are each applied individually to the inside surface of a tube face panel by a photographic technique, as is well known in the art. The face panel is of glass and comprises a generally dish-shaped structure having a portion on which the screen is formed which is surrounded by an upstanding sidewall. After the screen is completed, the face panel is sealed to a funnel-shaped body portion with a glass frit being used as the sealing medium. In order to insure a good seal, it is necessary that the frit seal edge of the panel; i.e., the edge formed around the upstanding wall, be clean and contaminant free. During the formation of the screen, contaminants in the form of surplus screening materials often collect on the frit seal edge and thus must be removed before sealing may be accomplished.

The chief contaminant is the photoresist material which is utilized to apply the patterned phosphors to the screen area. The photoresist is usually a photosensitized organic substance, such, for example, as polyvinyl alcohol (PVA) sensitized with ammonium dichromate. This material is often applied by spraying or by swirling an excess amount about the screen portion and pouring off the remainder. Whichever of the two methods is used, an accumulation of the PVA on the frit seal edge is practically unavoidable. It is practical, also, to remove this accumulation between each screening step rather than to wait until all of the different phosphors have been applied. Prior art methods of removing this accumulation consisted of holding the panel in a fixed position and having an operator manually wipe the edge, usually with a sponge. This method has several disadvantages. The removal of the accumulated surplus screening materials was seldom consistent between different operators and often varied from panel to panel when cleaned by the same operator. It necessitated periodic cleaning of the sponges which again introduced variances between operators. Rejects of panels could result if the edge were improperly cleaned or if a careless operator removed some of the PVA from desired areas of the screen. The method was also relatively slow and time consuming.

OBJECTS AND SUMMARY OF THE INVENTION

Thus, it is an object of the invention to enhance the fabrication of screened color cathode ray tube face panels.

It is another object of the invention to improve the consistency of cleaning operations.

Yet another object of the invention is the elimination of operator error from the cleaning function.

Still another object of the invention is the enhancement of the sealing operation between face panels and body portions.

These objects are achieved in one aspect of the invention by the provision of a method of removing surplus cleaning materials from the frit seal edge of a cathode ray tube face panel which comprises presenting a continuously cleaned blotter or sponge surface to the frit seal edge and then causing contact to occur between the edge and the blotter. Apparatus for accomplishing the method includes a tray containing a solvent for at least some of the surplus screening materials. At least two supporting rollers are mounted upon means associated with the tray which support an endless belt whose surface at least comprises a blotter or sponge material. The belt is supported so that at least a portion of it is within the solvent. Means are provided for substantially continuously driving the blotter and means operatively connected to the drive means is provided for stopping the blotter at selected intervals.

DESCRIPTION OF THE PREFERRED EMBODIMENTS

For a better understanding of the present invention, together with other and further objects, advantages, and capabilities thereof, reference is made to the following disclosure and appended claims in connection with the above-described drawings.

Figure 1:
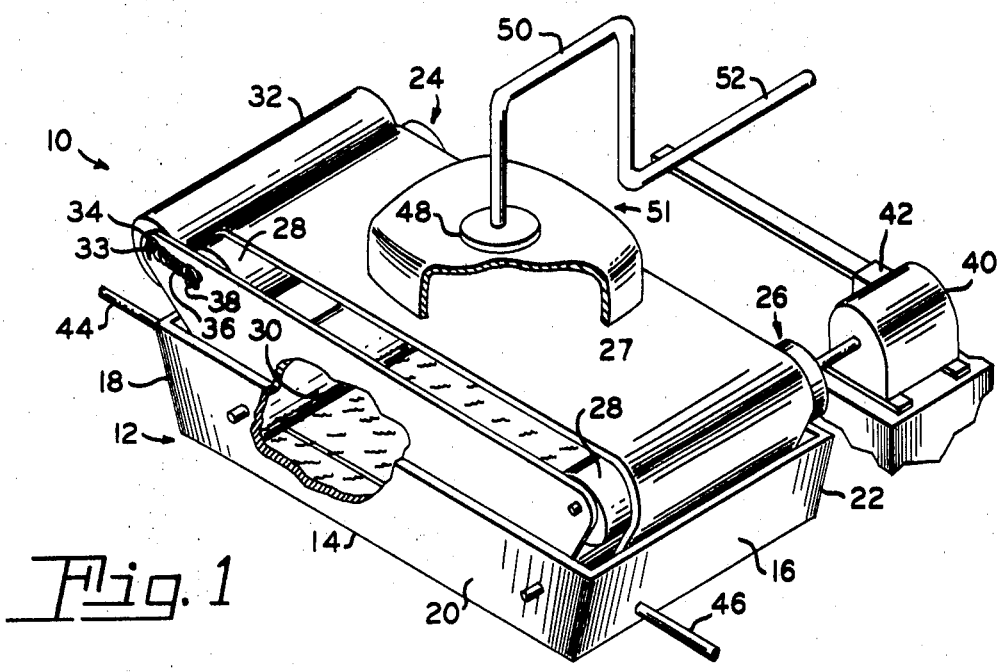
FIG. 1 is a perspective view of one embodiment of apparatus for carrying out the invention.

Referring now to the drawings with greater particularity, there is shown in FIG. 1 a frit seal edge cleaning apparatus, generally designated as 10. The apparatus comprises a solvent-containing tray 12 having a bottom 14, and walls 16, 18 and sidewalls 20, 22. Mounted within the walls and supported thereby are two pairs of supporting rollers 24, 26 for belt 27. Each of the pairs comprises an upper set of rollers 28 and a lower set 30 only one of which is shown; the latter carrying belt 27 through the solvent. An additional squeegee roller 32 is also provided and is in contact with one of the upper rollers for removing excess solvent. Roller 32 may also be mounted, as shown, upon the sidewalls, or by any other suitable means. The shaft 33 of the roller 32 is journaled in elongated slots 34 and the necessary tension thereon is provided by means of springs 36, only one of which is shown, which are slidably attached to the roller shaft and to fixed studs 38 on the sidewalls.

One of the supporting rollers, for example, 28 is capable of rotation, such as by connection with a motor 40. This motor continuously drives the roller, and thus the belt 27 through the solvent unless the action is stopped by actuation of microswitch 42, to be explained hereinafter.

Also provided are inlet and outlet means 44, 46 for continuously replenishing the solvent.

In operation, motor 40 drives the belt 27 through the solvent as explained above, continuously cleaning the belt. At some point, either as part of an automatic operation or a hand operation a face panel is placed on the upper surface of belt 27. FIG. 1 shows diagrammatically an automatic operation wherein a face panel supporting cup 48, such as a vacuum chuck carried by an arm 50 presents a face panel 51 to belt 27. A downward projection 52 in arm 50 contacts microswitch 42 before face panel 51 achieves contact therewith thus deactivating motor 40. The stopping action is desirable to prevent the face panel from tearing the surface of the belt. After the motion of the belt has stopped, the frit seal edge of panel 51 makes contact with the upper surface of belt 27. This upper surface of belt 27 is of an absorbent material, such, for example, as neoprene, cellulose sponge or polyurethane sponge. If this surface is made of material having a sufficient thickness not only will the frit seal edge of the panel be cleaned, but also a predetermined distance of the upstanding panel wall. After a time sufficient to clean the panel edge, the panel is raised, activating motor 40 and the apparatus is ready for the next cycle.

While in the instance described the panel has been brought into contact with the belt, if will be apparent that the panel may be held stationary and the entire cleaning apparatus raised to meet the panel, as by a hydraulic lift mechanism.

Figure 2:
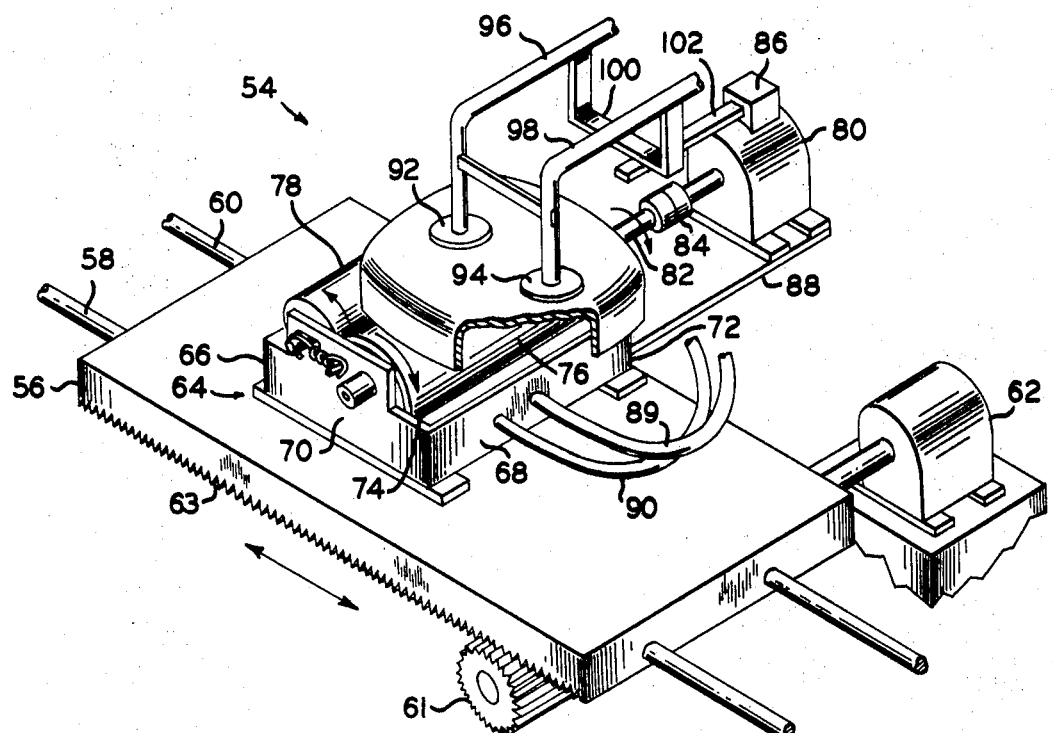
FIG. 2 is a perspective view of an alternate embodiment of apparatus for carrying out the invention.

An alternate embodiment of the invention is shown in FIG. 2. Herein the cleaning apparatus 54 comprises a longitudinally movable table 56 mounted on a pair of slide bars 58, 60 and driven by a pinion gear 61 attached to a reversible motor 62. When this type drive mechanism is utilized, the rack 63 for the pinion may be mounted on the bottom of table 56.

Mounted on table 56 is a solvent-containing tray 64 having a bottom and end walls 66, 68 and sidewalls 70, 72. In this instance a blotter belt 74 is formed as the surface of a single roller 76 which has its shaft ends journaled in sidewalls 70, 72. A squeegee roller 78 contacts roller 76 in the manner described above in regard to the first embodiment.

Roller 76 is disengageably driveable by motor 80 through the medium of a shaft 82 and clutch 84. Microswitch 86 controls the action of the clutch 84. The motor 80 is mounted on an extension 88 of table 56 and is movable therewith. Tray 64 is also provided with inlet and outlet means 89, 90 for continuously renewing the supply of solvent contained therein.

In operation, a face panel 51 is again brought into contact with the blotter surface on roller 76. The face panel is preferably carried by at least two holding devices such as vacuum chucks 92, 94, which are carried by arms 96, 98 respectively. A microswitch contacting portion 100 is carried by the arms and depends therefrom.

Table 56 is positioned, at the start of its cycle, to achieve contact with one of the edges of panel 51. When the panel descends, portion 100 engages the arm 102 of microswitch 86 which disengages clutch 84 leaving roller 76 rotational only by frictional contact with the frit seal edge of panel 51. Simultaneously, motor 62 is energized and begins driving table 56 and cleaning apparatus 54 beneath, and in contact with, the frit seal edge of panel 51. Roller 76 continues to rotate, due to the frictional pressure of panel 51, during the entire traversal thereof, thus completely cleaning the frit seal edge. After a complete traversal of the panel edge, panel 51 raises, clutch 84 engages and starts the driven rotation of roller 76, and motor 62 reverses and returns table 56 to its starting position for the commencement of the next cycle.

A further embodiment of the invention would be the utilization of means for rotating the face panel in a horizontal plane around the roller. Conversely, the panel could be held stationary and a surplus screening material removing roller could be rotated about the panel edge.

Furthermore, it is contemplated that both embodiments of the invention might be utilized for particular purposes during screen formation. For example, the embodiment of FIG. 1 has proven to be extremely useful in removing surplus photoresist, while the embodiment of FIG. 2 and the alternates thereof have proven suitable to the removal of surplus phosphor materials (deposited by a dry deposition method) before the screening exposure.

Thus it will be seen that this invention has provided an enhancement in the art of producing color television tubes. The consistency of the cleaning operations has been improved and operator error in the cleaning functions has been eliminated. Further, the achievement of these ideals has greatly enhanced the sealing operations between the face panel and body portions of color tubes.

While there have been shown and described what are at present considered the preferred embodiments of the invention, it will be obvious to those skilled in the art that various changes and modifications may be made therein without departing from the scope of the invention as defined by the appended claims.

I claim:

1. An apparatus for removing from the frit seal edge of a cathode ray tube face panel previously applied surplus screening materials comprising: a tray containing solvent for at least some of said surplus screening materials; a blotter-covered roller mounted with said tray in such a manner that at least a portion of said blotter is within said solvent; a longitudinally movable table mounting said tray; drive means for moving said table; disengageable drive means for causing rotative movement of said blotter-covered roller, said disengageable drive means being mounted to move with said table; and means operatively connected to said disengageable drive means for causing disengagement of said blotter-covered roller whereby said roller will be free to rotate by frictional contact.

2. The apparatus of claim 1 wherein a squeegee roller is contacted against said blotter-covered roller to remove excess solvent therefrom.

3. The apparatus of claim 1 wherein means are provided for substantially continuously renewing said solvent.